(12) United States Patent
Bonfill

(10) Patent No.: US 9,474,266 B2
(45) Date of Patent: Oct. 25, 2016

(54) FLOATING PLATFORM DUCK BLIND INCLUDING RELOCATION MEANS

(71) Applicant: Harry Bonfill, Roseville, CA (US)

(72) Inventor: Harry Bonfill, Roseville, CA (US)

(*) Notice: Subject to any disclaimer, the term of this patent is extended or adjusted under 35 U.S.C. 154(b) by 243 days.

(21) Appl. No.: 14/220,291

(22) Filed: Mar. 20, 2014

(65) Prior Publication Data

US 2014/0283432 A1  Sep. 25, 2014

Related U.S. Application Data

(60) Provisional application No. 61/804,043, filed on Mar. 21, 2013.

(51) Int. Cl.
*B63B 35/00* (2006.01)
*A01M 31/02* (2006.01)

(52) U.S. Cl.
CPC .................................. *A01M 31/025* (2013.01)

(58) Field of Classification Search
CPC ....... B63B 29/00; B63B 35/00; B63B 35/44; B63B 35/58; B63B 35/73; B63B 35/85; B63B 2029/00; B63B 2035/00; B63B 2035/44; B63B 2035/73; B63B 2035/737; B63B 2035/738; B63B 2035/85; A01M 31/025
USPC .......... 114/264, 343, 351, 354, 361; 441/35, 441/36
See application file for complete search history.

(56) References Cited

U.S. PATENT DOCUMENTS

| | | | | |
|---|---|---|---|---|
| 2,817,852 A * | 12/1957 | Neilson | ................ | B60P 3/1025 114/343 |
| 2,889,839 A * | 6/1959 | Sheridan, Jr. | ........... | B63B 17/02 114/351 |
| 3,533,376 A * | 10/1970 | Smith | .................... | A01K 1/033 119/28.5 |
| 5,615,633 A * | 4/1997 | Cripe | ..................... | B63B 15/00 114/351 |
| 5,887,539 A * | 3/1999 | Rex | ....................... | A01M 31/00 114/351 |
| 7,401,566 B1 * | 7/2008 | Miknich | ................. | B63B 17/02 114/351 |
| 2004/0083942 A1 * | 5/2004 | Dunn | ..................... | B63B 35/00 114/351 |

* cited by examiner

*Primary Examiner* — Daniel V Venne
(74) *Attorney, Agent, or Firm* — Adam Boskovic

(57) ABSTRACT

A floating duck blind for use in waterfowl hunting; nature photography; and/or bird watching. A framed platform portion encased in closed cell polyurethane and a polyuria outer coating for buoyancy and durability includes several vertical openings that allow the platform to be staked into a position in the water. A metal wire mesh enclosure enables camouflaging means to be affixed to hide the platform and the occupants. A dog box portion communicates from the enclosed platform to the outside of the duck blind so that hunting dogs can get in and out during retrieval. A transom portion enables attachment of an outboard motor and relocation of the duck blind.

1 Claim, 6 Drawing Sheets

FLOATING PLATFORM DUCK BLIND INCLUDING RELOCATION MEANS

CROSS REFERENCE TO RELATED APPLICATIONS

The present application depends from Provisional application 61/804,043 dated Mar. 21, 2013 entitled "Improved Duck Blind Including Relocation Means."

STATEMENT REGARDING FEDERALLY SPONSORED RESEARCH OR DEVELOPMENT

Not Applicable.

BACKGROUND OF THE INVENTION

1. Field of the Invention

The present invention relates to means for camouflaging and hiding persons near or in water, commonly referred to as a "blind" or a "duck blind." More specifically, the present invention also relates to camouflaging and staging persons near or in water for purposes that may include: riparian bird hunting; ecological tracking or studying purposes; bird watching; and/or nature photography.

2. Description of Related Art

The current art in blinds comprises ground tank blinds and fixed cage stand-up blinds. The major problem with both styles is that they cannot be moved once positioned. Large backhoes have to either dig holes for the tank blinds or create an island of earth to safely position a fixed cage stand up duck blind. Once set, both duck blinds are impossible to move. Rising water levels often flood both tank and stand up blinds rendering them useless. Where ducks may require landing into the wind, fixed duck blinds positioned on the incorrect side of the water are completely useless in an opposite wind situation. It is extremely difficult for people to enter and exit a tank blind due to the fact that it is buried 4-5' into the ground and with the top being level with the surface ground. It is very difficult for people to walk through very muddy water to get out to the stand-up duck blind. Many elderly and disabled duck hunters give up the sport due to the difficulty incurred with both above styles of duck blinds.

The current art also includes means for keeping a hunter positioned over water with personal flotation devices where the user lies in water on top of buoyant surface and covers themselves in local foliage. Additionally, there exists in the art structures for camouflaging hunters standing on a boat.

There does not exist in the current art, however, the present invention which is a very stable floating caged platform that supports several hunters and dogs and permits camouflaging means to be affixed and which addresses the above disadvantages to the current art.

SUMMARY OF THE INVENTION

The present invention relates to: duck blinds and other means for housing and camouflaging person near a waterline. The present invention comprises a large camouflaged floating platform that permits ground level type ingress and egress but can also be easily moved.

It is therefore an object of the present invention to comprise a blind.

It is another object of the present invention to permit those using the present invention to get closer to riparian birds of interest for any purpose including the aforementioned purposes.

It is another object of the present invention to permit elderly and disabled persons easy access by comprising a nearly ground-level standing area with easy entry and exit means.

It is another object of the present invention to comprise a floating duck blind including a transom that permits attachment of an outboard motor with which to move said blind.

It is another object of the present invention to further comprise a means for duck blind access by hunting dogs commonly used in duck hunting to retrieve felled waterfowl.

It is another object of the present invention to comprise a floating platform that can be staked or anchored to a chosen location in the water via vertically oriented openings in said platform; said openings additionally permit the present invention to rise and fall with water level changes whereby the platform openings permit the platform to go up and down along the outer circumferences of said stakes; the present invention can hereby be used in high wind and moving water where staking prevents positional movement of the platform.

The characteristics and utilities of the present invention described in this summary and the detailed description below are not all inclusive. Many additional features and advantages will be apparent to one of ordinary skill in the art given the following description. There has thus been outlined, rather broadly, the more important features of the invention in order that the detailed description thereof that follows may be better understood, and in order that the present contribution to the art may be better appreciated.

In this respect, by explaining at least one embodiment of the invention in detail, it is to be understood that the invention is not limited in its application to the details of construction and to the arrangements of the components set forth in the description. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the description be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, nor is it intended to be limiting as to the scope of the invention in any way.

The characteristics and utilities of the present invention described in this summary and the detailed description below are not all inclusive. Many additional features and advantages will be apparent to one of ordinary skill in the art given the following detailed description.

DETAILED DESCRIPTION

Figure 1A:
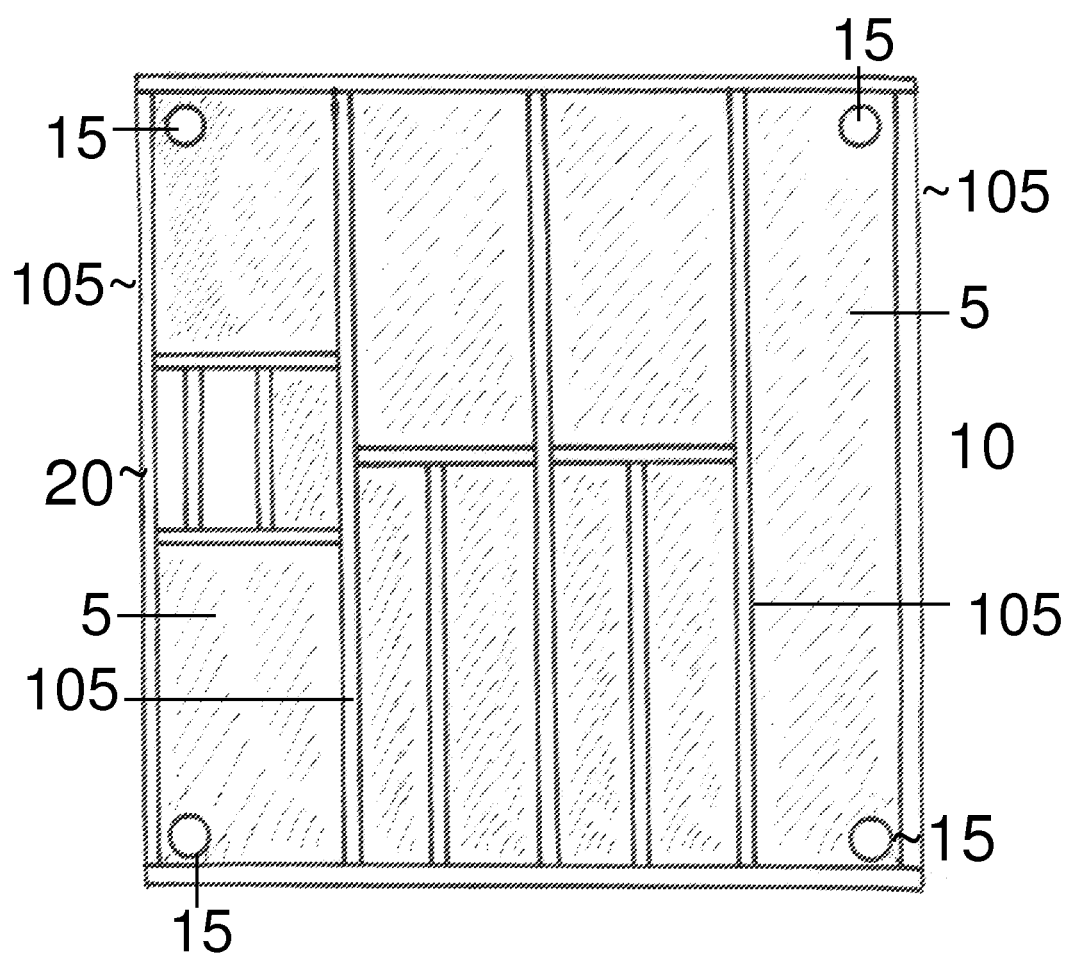
FIG. 1A is a plain view of the platform framing members and affixed plywood top portion, turned upside down for the purpose applying closed cell polyurethane into the voids created between the framing members and the plywood top.
Figure 1B:
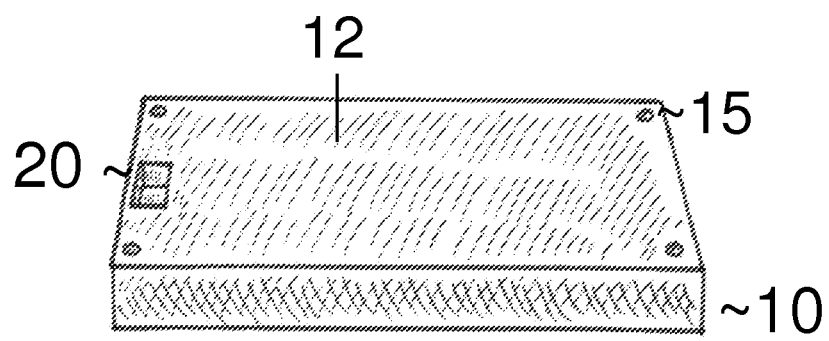
FIG. 1B is a perspective top view of the platform portion after being filled in and covered with closed cell polyurethane and then coated in polyuria, and shows vertical openings at platform portion corner areas for staking the platform to a position over the water.
Figure 2A:
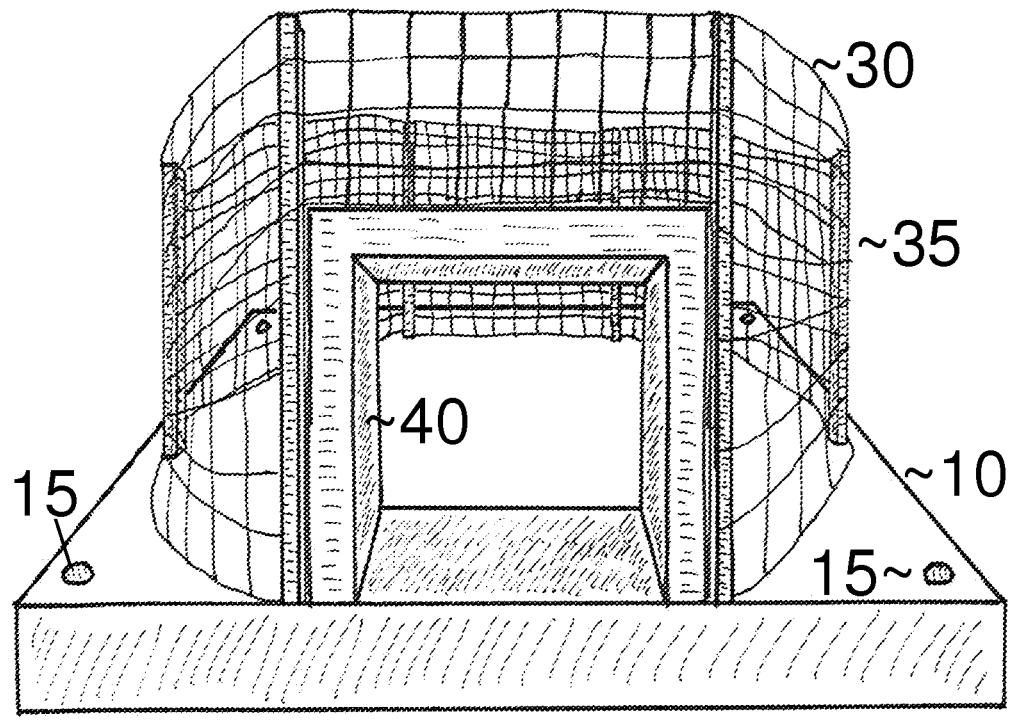
FIG. 2A is a perspective view of the platform portion with the dog box added; vertical posts are affixed roughly along the perimeter of the platform portion and metal mesh material attached to said posts forming a cage that encloses the center of the platform.
Figure 2B:
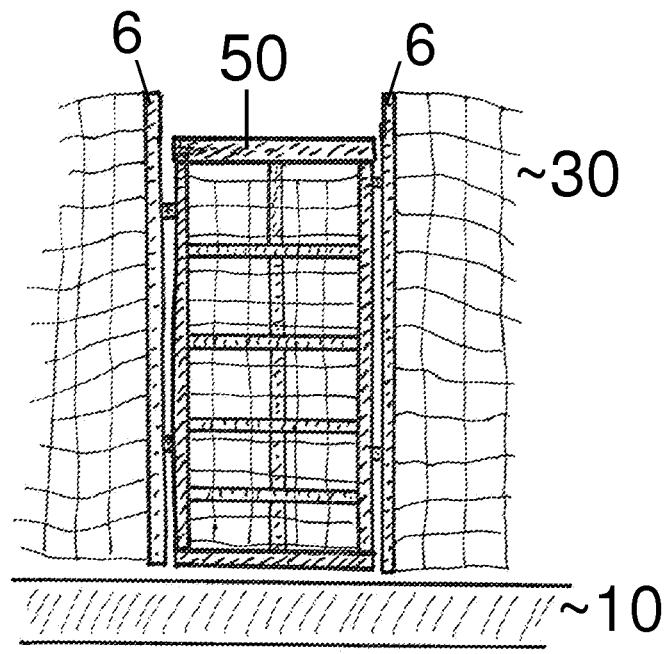
FIG. 2B is a front view of a swinging door added between vertical posts that form a doorframe.
Figure 3:
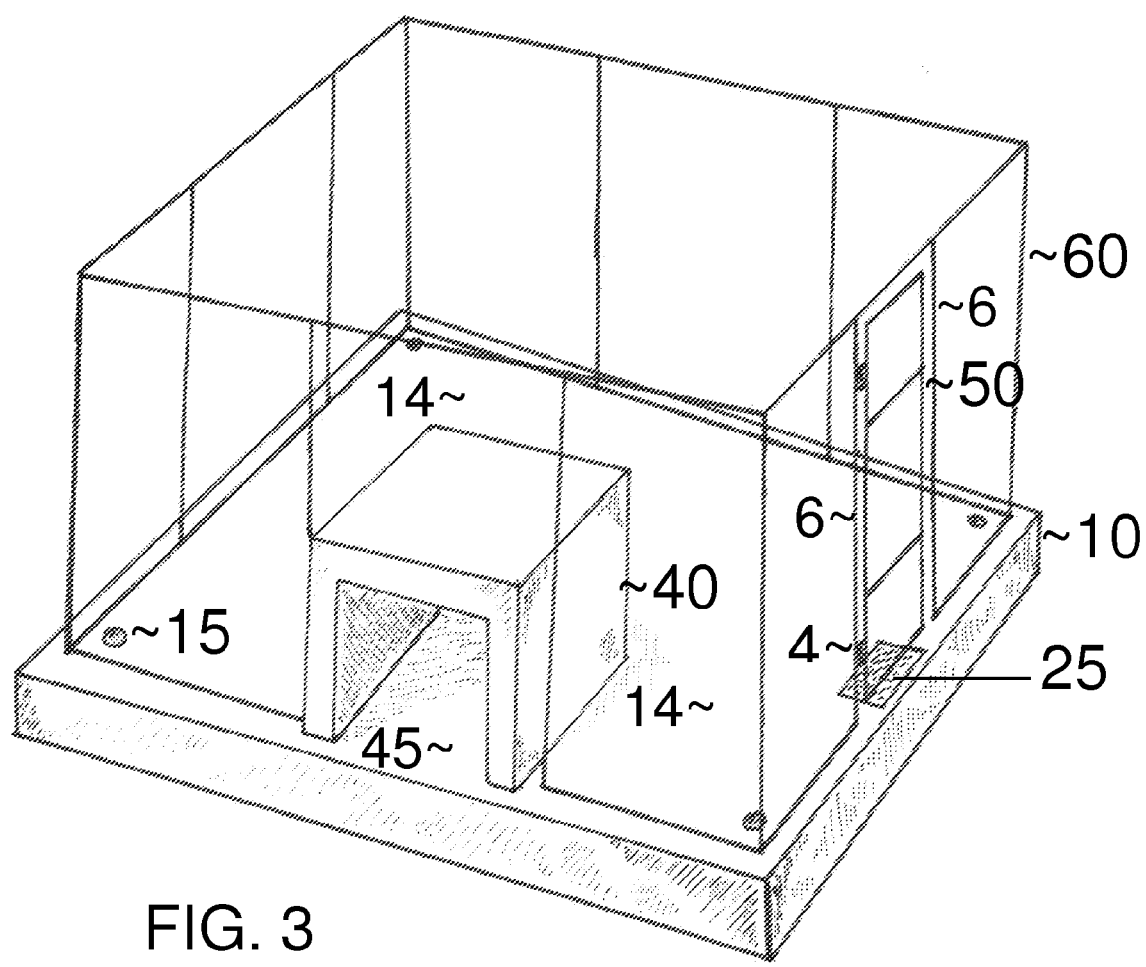
FIG. 3 is a perspective side view of the invention showing a thin tubular metal cage frame affixed to the platform portion used to support the metal mesh material and entryway; the transom portion is located at the entryway and is covered for entry/exit.

In a preferred embodiment, the floating platform portion of the present invention achieves buoyancy (has a density less than that of water) and structural integrity. A 6-10 inch deep platform 10 is framed using wooden framing members 105 and strengthened with a plywood top portion 5. The framed platform is inverted so that closed cell polyurethane can be sprayed to fill platform frame voids and on all surfaces to form a planar top surface and so that no wooden framing components can be exposed to water (See FIG. 1B). After curing of the polyurethane, the platform is turned right side up and polyuria is applied creating a very durable shell around said closed cell polyurethane. The result of the polyurethane applied to the framed platform is a structurally rigid and buoyant structure capable of keeping users, dogs, and equipment afloat on a very stable surface 10 (See FIG. 1B).

Incorporated into the platform portion are a plurality of vertical openings 15 communicating completely through said platform with approximate diameters of 3-10 inches. These openings permit long stakes to be employed so that the present invention can be staked to a location over the water by driving the stakes into the floor of the body of water over which the platform is positioned. This configuration also permits the platform to travel vertically along the axis of the stakes without straining the stakes as water levels change with the tide.

Figure 4A:
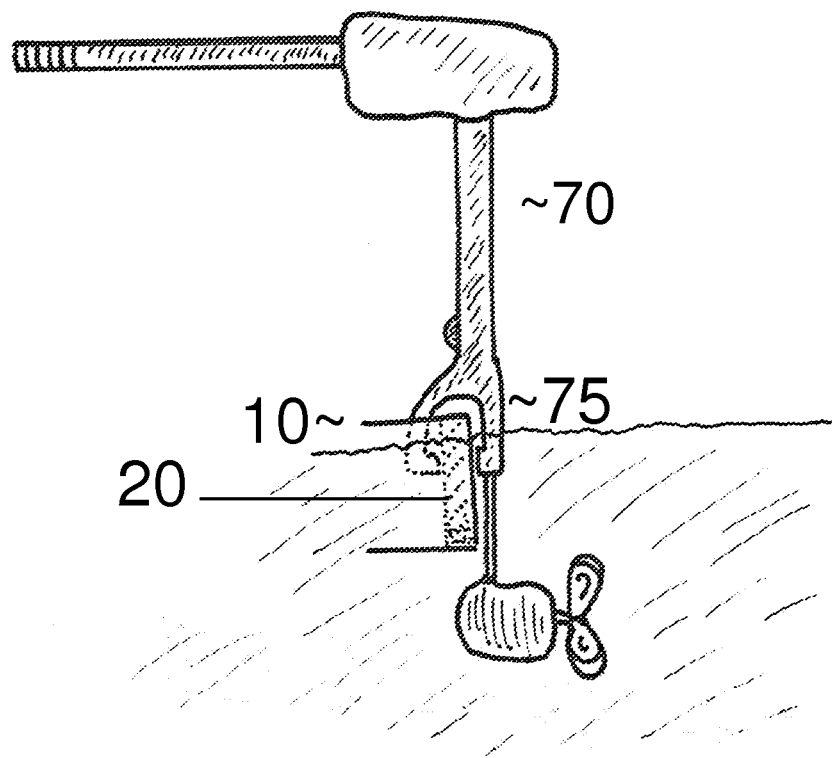
FIG. 4A is a side interior view of the platform transom portion showing a part of the electric motor clamping means (shown partially in dotted line) as attached to the transom (show partially in dotted line).
Figure 4B:
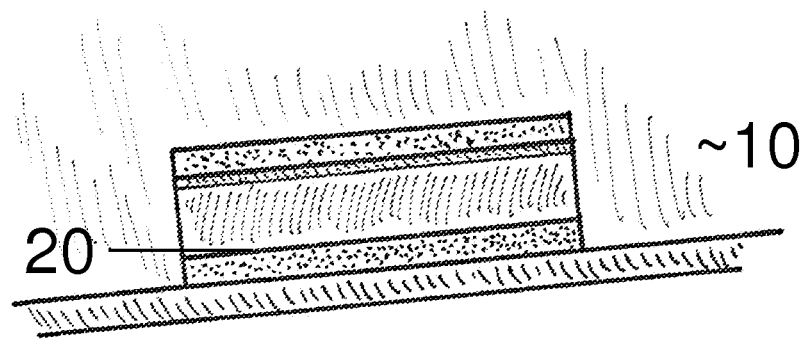
FIG. 4B is a perspective top view that shows the platform transom portion with the transom cover removed in order to access the transom portion.
Figure 5A:
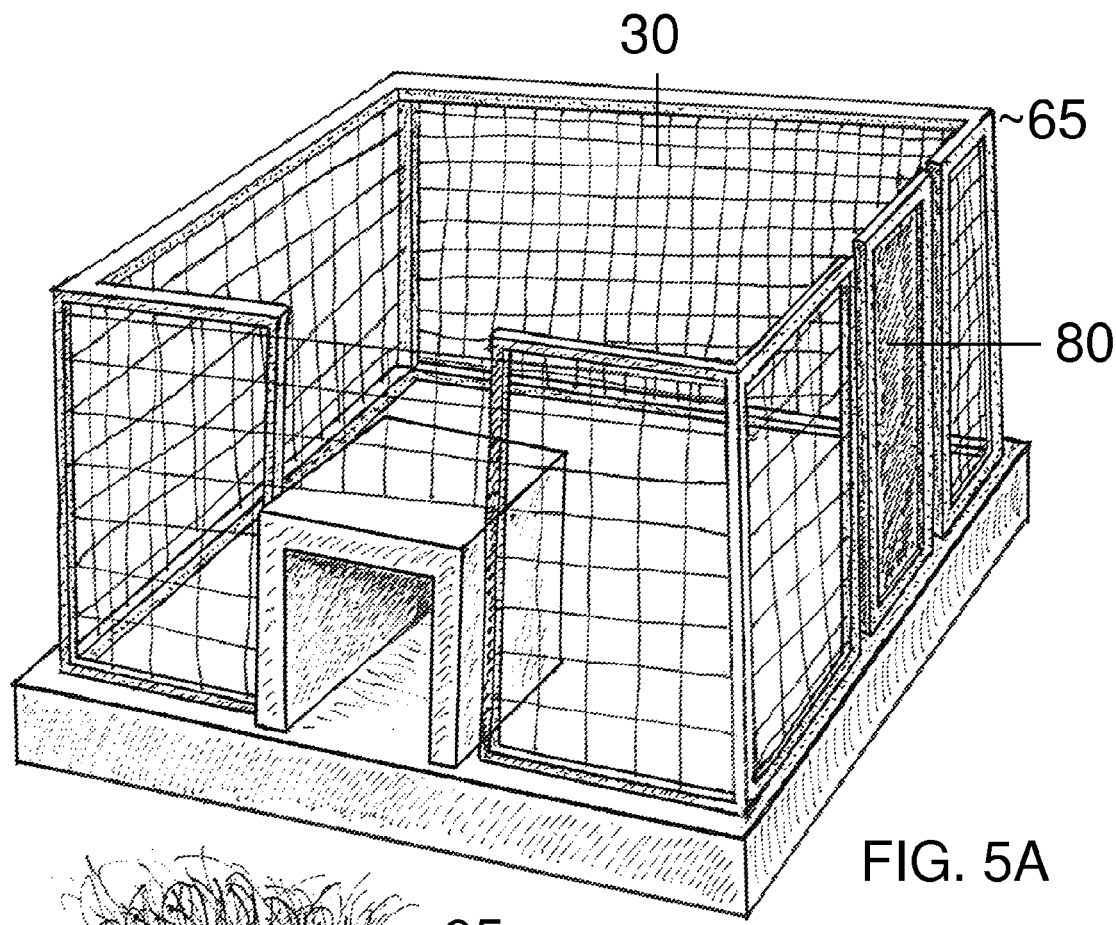
FIG. 5A is a perspective side view of the invention with a metal cage frame portion made from squared framing members and supporting a ramp entry/exit means.
Figure 5B:
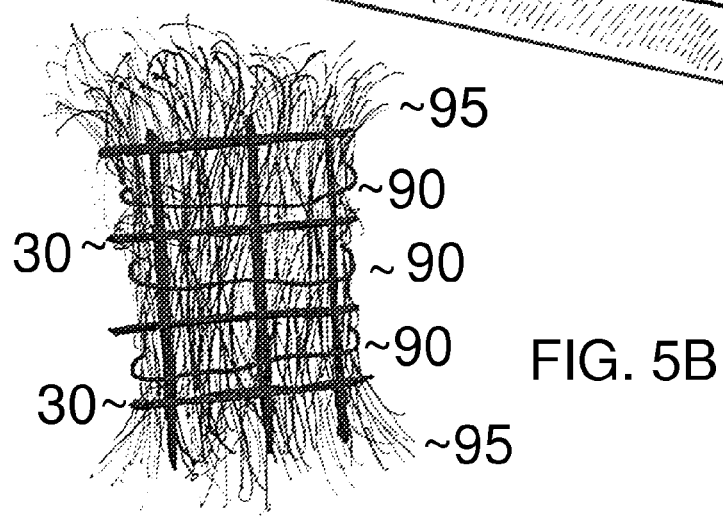
FIG. 5B is a perspective front view of a portion of the metal mesh material with a bale or bunch of weeds and tulles attached to said metal mesh material using wire or string and weaved into said metal mesh material openings.
Figure 6A:
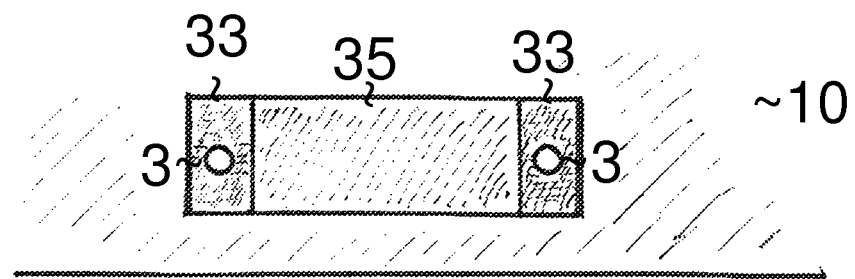
FIG. 6A is a plain top view of a post and post bracket for affixing the post to the platform.
Figure 6B:
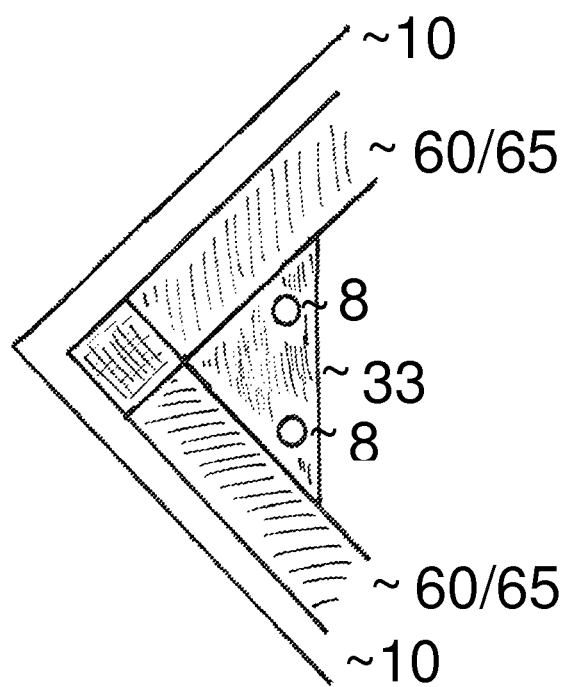
FIG. 6B is a plain top view of a cage section and cage bracket for affixing that portion of the cage to the platform.

The platform portion additionally comprises a transom portion 20 permitting attachment of an electric outboard motor 70 (See FIG. 4A). It is advantageous as described in the Summary portion of this application to change position of the present invention in order to adapt to wind conditions and other considerations in achieving hunting success. It is also an advantage to move the present invention so that it can be more easily accessed for the purpose of loading it onto a trailer at a boat launch area or similar. The transom portion includes a transom cover 25 which is placed over the transom opening to permit safe entry and exit and which lies flush to the platform portion top surface. In use, users enter the interior of the platform through an entryway with the transom cover in place. The transom cover is then removed and the electric outboard motor bottom clamp portion 75 is slid onto the transom 20 and tightened into place against the transom.

A metal mesh material 30 is affixed to vertical metal posts 35, or metal tubular 60 or squared 65 cage framing members, in order to enclose the occupants of the present invention and extending vertically upward from the top surface of the platform. The metal posts 35 include a bracket portion 37 that employs apertures 3 through which screws or nails may be employed to affix the post to the platform. The cage framing members 60/65 include a corner bracket portion 33 that employs apertures 8 through which screws or nails may be employed to affix the cage corner areas to the platform. Said metal posts and cage framing members further support a door 50, door frame 6, and hinge 4 preferably oriented such that the door only opens inward for safety. In an alternative embodiment, a ramp entry means 80 is used instead of or in addition to said door 50 to permit access by elderly or disabled users. Weeds, tulles and other local plant materials 95 are affixed to the mesh material by weaving said materials through the mesh material 30 openings and/or with wires or string 90 to enable the present invention to be made to look like the surrounding foliage at the waterline while hiding the occupants from view. Metal hooks on the interior surface of the mesh fencing enclosure may be employed to hang equipment and clothing.

The platform portion additionally comprises a dog box portion 40. The dog box comprises a two-sided covered structure added to the top surface of the platform and is generally oriented to present a horizontal opening 45 that communicates from the platform inner area inside the enclosure to the outside of the enclosed platform facing the water. The dog box enables hunting dogs used to retrieve fallen waterfowl to travel in and out of the enclosed platform.

The previous is a detailed description of embodiments of the present invention. As these embodiments of the present invention are described, various modifications or adaptations of the methods and or specific structures described may become apparent to those skilled in the art. All such modifications, adaptations, or variations that rely upon the teachings of the present invention, and through which these teachings have advanced the art, are considered to be within the spirit and scope of the present invention. Hence, the description is not to be considered in a limiting sense, as it is understood that the present invention is in no way limited to the embodiments described.

What is claimed is:

1. A movable flotation platform for supporting and camouflaging a load above a top surface of a body of water, the movable flotation platform comprising:

a frame, presented in a horizontal and planar orientation, comprising intersecting frame members and intersecting internal frame support members, and a top surface member affixed to top surfaces of the intersecting frame members and the intersecting internal frame support members;

a closed cell polyurethane coating on the frame creating a stable buoyant deck with a generally planar upper surface and with an overall density less than that of water such that when deployed in a body of water, the stable buoyant deck can support users, equipment, and dogs adjacent to a top surface of a body of water;

a coating of polyuria on the generally planar upper surface of the stable buoyant deck that protects and seals the closed cell polyurethane coating;

at least two apertures that are oriented vertically and communicate through the stable buoyant deck such that a stake can be deployed through an aperture and into a portion of soil located under a body of water and over which the stable buoyant deck is positioned so as to hold the movable flotation platform against horizontal movement;

an enclosure comprising wire mesh material distributed in a vertical orientation around a periphery of the generally planar upper surface of the buoyant stable deck and supported by vertical posts or a framed cage that are affixed to the generally planar upper surface of the buoyant stable deck, the wire mesh material having intersecting wire members which local weeds and tulles or other plant material can be woven around and/or affixed to with string or wire in order to cover and hide any users, dogs, and equipment on the generally planar upper surface of the buoyant stable deck as a form of camouflage;

a dog box located on the generally planar upper surface of the buoyant stable deck comprising a covered structure that presents a horizontal opening communicating through a portion of the enclosure that, when deployed, permits hunting dogs positioned on an internal area of the generally planar upper surface of the stable buoyant deck defined by and hidden by the enclosure to exit the buoyant stable deck through the covered structure in order to retrieve fallen birds from a surrounding body of water and then re-enter the covered structure from the surrounding body water and travel through the covered structure back to the internal area of the generally planar upper surface of the stable buoyant deck defined by and hidden by the enclosure;

a transom for attachment of a small electric outboard motor enabling re-positioning of the movable flotation platform to take advantage of changing wind and tide conditions, to optimize hunting location, and to bring the movable flotation platform to and from a convenient shore location for removal from and deployment in a body of water; and an entryway comprising a door and/or a removable ramp supported by posts or framed cage frame members in the enclosure, to permit users ingress through an opening in the enclosure and onto the generally planar upper surface of the stable buoyant deck.

\* \* \* \* \*